(12) United States Patent
Strandjord et al.

(10) Patent No.: US 6,765,678 B2
(45) Date of Patent: Jul. 20, 2004

(54) RELATIVE INTENSITY NOISE CONTROLLER WITH MAXIMUM GAIN AT FREQUENCIES AT OR ABOVE THE BIAS MODULATION FREQUENCY OR WITH SECOND ORDER FEEDBACK FOR FIBER LIGHT SOURCES

(75) Inventors: Lee K. Strandjord, Tonka Bay, MN (US); Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 191 days.

(21) Appl. No.: 10/041,192

(22) Filed: Jan. 8, 2002

(65) Prior Publication Data

US 2003/0128365 A1 Jul. 10, 2003

(51) Int. Cl.[7] ............................................. G01C 19/72
(52) U.S. Cl. ..................................................... 356/460
(58) Field of Search ................................. 356/460, 464, 356/FOR 112; 250/227.19, 227.27; 385/12; 372/6, 29.02, 31

(56) References Cited

U.S. PATENT DOCUMENTS

| | | |
|---|---|---|
| 5,245,407 A | 9/1993 | Nishiura et al. |
| 5,280,339 A | 1/1994 | Hollinger et al. |
| 5,309,220 A | 5/1994 | Hollinger et al. |
| 5,331,404 A | 7/1994 | Moeller et al. |
| 5,465,149 A | 11/1995 | Strandjord et al. |
| 5,559,908 A | 9/1996 | August et al. |
| 5,701,318 A | 12/1997 | Digonnet et al. |
| 5,734,469 A | 3/1998 | Strandjord |
| 5,767,968 A | 6/1998 | Strandjord |
| 5,781,300 A | 7/1998 | Strandjord et al. |
| 5,894,488 A | 4/1999 | Gaiffe et al. |
| 5,898,496 A | 4/1999 | Huang et al. |
| 5,923,424 A | 7/1999 | Sanders et al. |
| 5,926,275 A | 7/1999 | Sanders et al. |
| 5,953,122 A | 9/1999 | Ecke et al. |
| 5,978,084 A | 11/1999 | Blake |
| 5,999,304 A | 12/1999 | Sanders et al. |
| 6,094,298 A | 7/2000 | Luo et al. |
| 6,097,743 A | 8/2000 | Alphonse |
| 6,144,486 A | 11/2000 | Bennett et al. |
| 6,144,788 A | 11/2000 | Ang et al. |
| 6,175,410 B1 | 1/2001 | Szafraniec et al. |
| 6,204,921 B1 | 3/2001 | Strandjord et al. |
| 6,211,963 B1 | 4/2001 | Kaliszek et al. |
| 6,330,105 B1 * | 12/2001 | Rozelle et al. ............... 356/460 |

OTHER PUBLICATIONS

Desurvire, et al., Amplification of Spontaneous Emission in Erbium–Doped Single–Mode Fibers, Journal of Lightwave Technology, vol. 7, No. 5, May 1989, pp. 835–845.

Polynkin, et al., "All–optical noise–subtraction scheme for a fiber–optic gyroscope", Optics Letters, vol. 25, No. 3, Feb. 1, 2000, pp. 147–149.

* cited by examiner

*Primary Examiner*—Samuel A. Turner
(74) *Attorney, Agent, or Firm*—Schiff Hardin LLP (57) ABSTRACT

A system and method is provided which suppresses relative intensity noise in a fiber optic gyroscope by taking advantage of the frequency response of erbium fiber. In operation, the gain provided by the erbium fiber is added to the gain of the other components in the feedback loop to provide for stable loop performance up to about 250 kHz. The frequency response of the erbium fiber of about 3 kHz also provides a 6 db per octave roll-off, which, when used in a negative feedback control loop for controlling the current flowing to the gyroscope light source, allows for a relative intensity noise control loop with a bandwidth much greater than 3 kHz; this may be used in high performance gyroscope applications.

26 Claims, 6 Drawing Sheets

RELATIVE INTENSITY NOISE CONTROLLER WITH MAXIMUM GAIN AT FREQUENCIES AT OR ABOVE THE BIAS MODULATION FREQUENCY OR WITH SECOND ORDER FEEDBACK FOR FIBER LIGHT SOURCES

BACKGROUND OF THE INVENTION

1. Field of the Invention

This invention generally relates to fiber optic gyroscopes, and methods of making and operating fiber optic gyroscopes.

2. Description of the Related Art

Fiber-optic gyroscopes are included in a powerful class of sensors which bring to measurement systems many of the advantages that optical-fiber technology has brought to communications systems. For example, the very high bandwidth of optical fibers used in fiber optic gyroscopes allows the fiber optic gyroscope to convey a large amount of measurement information through a single fiber. In addition, because optical fiber is a dielectric, it is not subject to interference from electromagnetic waves that might be present in the sensing environment. Furthermore, fiber-optic gyroscopes typically can function under adverse conditions of temperature and pressure, and toxic or corrosive atmospheres that generally erode metals at a rapid rate.

The problem inherent in many conventional fiber optic gyroscopes, however, is that they can be sensitive to excess noise disturbances at low rotation rates. For example, the well known Raleigh scattering (i.e., scattering of light due to inhomogeneities in material density smaller than a wavelength in size), polarization noise (i.e., polarization fluctuations observed via voltage fluctuations), and zero rotation drift due to the Kerr effect (i.e., the development of birefringence when an isotropic transparent substance is placed in an electrical field) are typical problems which often reduce the accuracy of the optical gyroscope output by introducing errors in rotation rate sensing.

To minimize the errors in rotation rate sensing resulting from excess noise disturbances, fiber optic gyroscope system designers typically use broadband optical sources in gyroscope system construction. More particularly, fiber optic gyroscope designers typically use broadband optical sources with a stable spectra, such as, for example, super luminescent diodes (SLDs) or super luminescent fiber sources (SLSs), etc. The downside to using these sources, however, is that due to their finite bandwidth, these broadband sources introduce an additional excess noise term into the gyro output. This, in turn, causes a reduction in performance and satisfaction of the fiber optic gyroscope systems. It is, therefore, desirable to eliminate the excess noise component introduced by the broadband source in the gyro output to achieve optimum gyroscope performance.

Unfortunately, where SLDs are implemented in fiber optic gyroscopes, the fiber optic gyroscope generally suffers from a high wavelength sensitivity to temperature, inefficient coupling to single-mode fibers, and a lack of immunity to optical feedback. Consequently, in recent years, fiber optic gyroscope designers have focused less on fiber optic gyroscope systems using SLDs and more on super luminescent fiber sources (SLSs), which do not typically exhibit most of the problems inherent in the SLDs.

For example, where SLSs are used the fiber optic gyroscope will have a more stable response over temperature ranges inside the SLS spectrum. That is, the temperature stability of the SLS spectrum (in particular, its center wavelength) is far superior to that of the SLDs, whose emission wavelength typically varies by about 0.05 nm/deg C. Furthermore, by designing with SLSs, the fiber optic gyroscope designer is capable of generating more power in an SLS than is available in an SLD. For example, in a typical SLD, the available power is approximately 30 mW, of which probably no more than a few milliwatts can be coupled to a single mode fiber. On the other hand, where a typical SLS is used, the fiber optic gyroscope designer is capable of generating approximately 40 mW to 200 mW of power. Additionally, in a practical system, unwanted spurious reflections from the source/system interface can greatly reduce the power which can be coupled to the system fiber. These reflections can be minimized in the SLS fiber device by splicing the source and system fibers with a fused glass-to-glass splice, which typically can not be realized with SLDs. Finally, the high conversion efficiency of the SLS fiber source and its broad character pump band make SLSs a beneficial choice over SLDs for many compact, laser-diode-pumped configurations.

Super luminescent fiber sources (SLSs) typically consist of a single-mode fiber with a core doped with an ionictrivalent rare earth element, such as model HG980 from Lucent Technologies in Chesterfield, Mo., a pump laser such as FLD148G3NL-S from Fujitsu of Japan, and a wavelength division multiplexer (WDM) such as model WS1415-LW from JDS Uniphase in Bloomfield, Conn. SLS's are well known in the art, and have been advantageously used to provide broadband (e.g., on the order of 10–30 nanometers) laser-like (highly directional) light beams for multiple applications, particularly in the communications field. For a description of an exemplary super luminescent fiber source, see "Amplification of Spontaneous Emission in Erbium-Doped Single-Mode Fibers," by Emmanuel Desuvrie and J. R. Simpson, published by IEEE, in "Journal of Lightwave Technology," Vol. 7, No. 5, May 1989, incorporated herein by reference.

As noted, an SLS typically includes a length of single-mode fiber, with a core doped with an ionic trivalent rare earth element. For example, neodymium ($Nd3+$) and erbium ($Er3+$) are rare earth elements that may be used to dope the core of a single-mode fiber so that the core acts as a laser medium. During operation, the fiber receives a pump input signal at one end, which is provided by a pump laser. The pump input signal is typically a laser signal having a specific wavelength $\lambda p$. The ions within the fiber core absorb the input laser radiation at wavelength $\lambda p$ so that electrons in the outer shells of these ions are excited to a higher energy state of the ions. When a sufficient pump power is input into the end of the fiber, a population inversion is created (i.e., more electrons within the ions are in the excited state than are in the ground state), and a significant amount of fluorescence builds up along the fiber in both directions. As is well known, the fluorescence (i.e., the emission of photons at a different wavelength $\lambda s$) is due to the spontaneous return of electrons from the excited state to the ground state so that a photon at a wavelength $\lambda s$ is emitted during the transition from the excited state to the ground state. The light which is emitted at the wavelength $\lambda s$ from the fiber is highly directional light, as in conventional laser light. One main characteristic of this emission which makes it different from that of a traditional laser (i.e., one which incorporates an optical resonator), however, is that the spectral content of the light emitted from the super luminescent fiber sources is generally very broad (between 1 and 30 nanometers). Thus, the optical signal output by the fiber will typically be at wavelength λp +/− about 15 nanometers.

Figure 1:
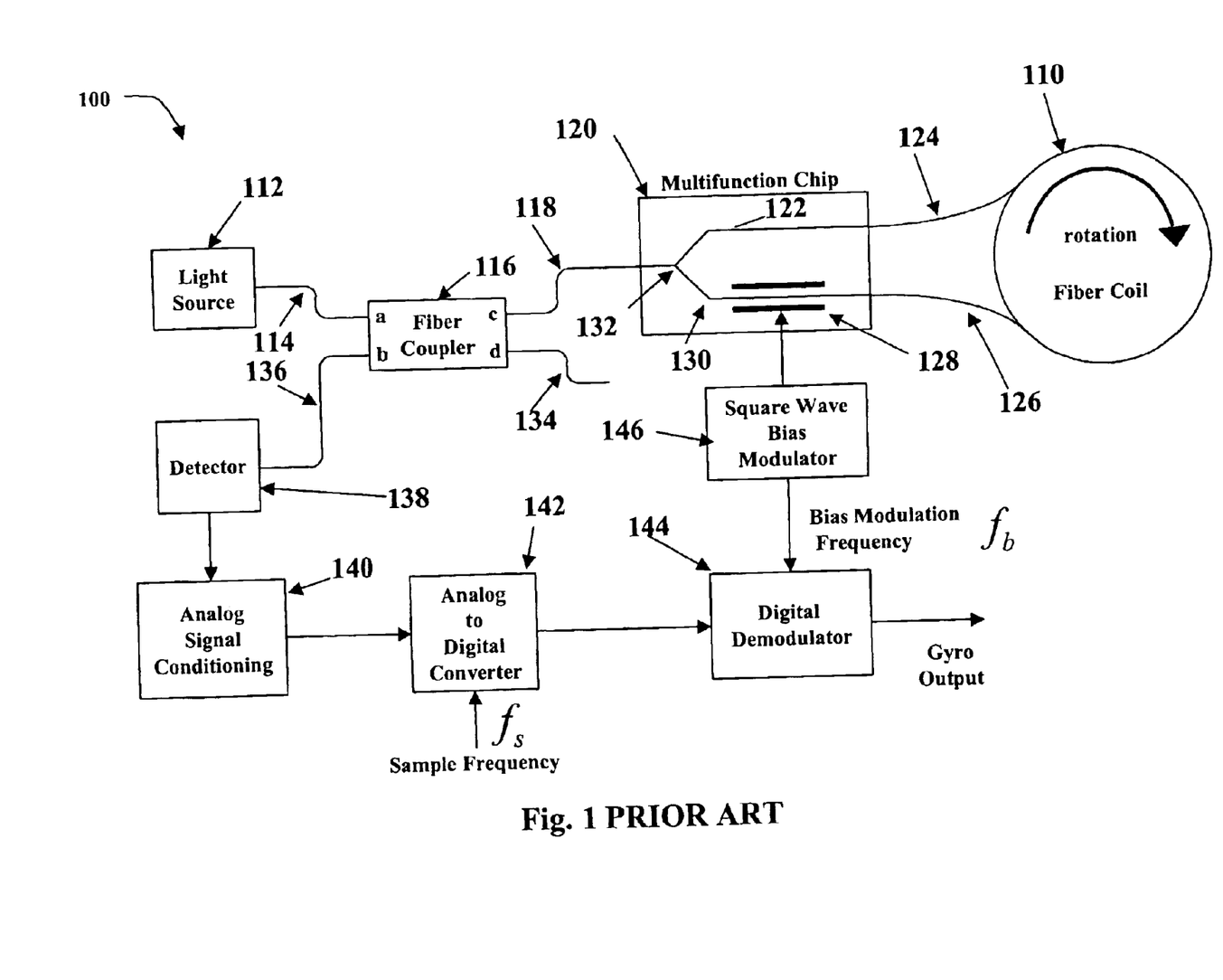
FIG. 1 is a schematic block diagram of a prior art fiber optic gyroscope employing a digital demodulator.

The construction and operation of conventional fiber optic gyroscopes is well known, and as such, will not be discussed in detail. A typical discussion of fiber optic gyroscopes may be found in U.S. Pat. No. 5,465,149 issued Nov. 7, 1995 to Strandjord, et al., and incorporated by reference herein. For illustrative purposes, FIG. 1 illustrates an exemplary fiber optic gyroscope system 100, which may be found in the prior art. In general, the optical portion of the system 100 contains several features along the optical paths to assure that this system is reciprocal. That is, when considering the system, substantially identical optical paths occur for each of the opposite direction propagating electromagnetic waves except for the specific introductions of non-reciprocal phase difference shifts, as is described below. In general, the features along the optical paths include a fiber optic light source 112, a fiber (tap) coupler 116, a multifunctional processing chip (e.g., integrated optics chip) 120, and a fiber optics coil 110, which are all variously connected by optical fiber portions 114, 118, 124 and 126.

Coiled optical fiber forms the coil 110 about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

Light source 112 may be any broadband light source for propagating electromagnetic waves through the fiber optics system 100. This source 112 is typically a semiconductor super luminescent diode or a rare earth doped fiber light source which provides electromagnetic waves near the infrared part of the spectrum, over a range of typical wavelengths between 830 nanometers (nm) and 1550 nm. In general, source 112 will have a short coherence length for emitted light to reduce the phase shift difference errors between these waves due to Rayleigh and Fresnel scattering at scattering sites in coil 110.

Between light source 112 and fiber optic coil 110 is an optical path arrangement formed by the extension of the ends of the optical fiber forming coil 110 to some optical coupling components which separate the overall optical path into several optical path portions. As shown, optical fiber portion 114 is positioned against light source 112 at a point of optimum light emission from it, and, additionally, extends to the optical directional coupler 116 (also referred to as a optical light beam coupler or wave combiner and splitter), in which the optical fiber portion 114 ensures that the light source 112 and coupler 116 are in constant communication.

Coupler 116 has light transmission media inside which extend between four ports a, b, c, and d, which are shown on each end of coupler 116. Port a is connected to light source 112 via optical fiber 114 positioned against it. At port b, on the sense end of optical directional coupler 116 is a further optical fiber 136 which extends to be positioned against a photodetector 138.

Photodetector 138 detects electromagnetic waves, or light waves, impinging on it from optical fiber portion 136 positioned against it and provides a photo current in response to a signal component selector (not shown). This photocurrent, as indicated above, in the case of two nearly coherent impinging light waves, follows a raised cosine function in providing a photocurrent output which depends on the cosine of the phase difference between such a pair of substantially coherent light waves. This photodetector device will operate at a very low impedance to provide the photo current which is a linear function of the impinging radiation, and may typically be a p-i-n photodiode.

Also positioned against coupler 116 is an optical fiber 134, which may typically not be used in the operation of the gyroscope. Abutting against port c of coupler 116 is yet another optical fiber 118 extending to multifunctional integrated optics chip 120, including a phase modulator 128, and integrated optics waveguides 122 and 130 which form a y-junction 132. Leading from multifunctional processing chip 120 are optical fibers 124 and 126, which are connected to fiber coil 110 via waveguides 122 and 130 respectively.

Between port b of fiber coupler 116 and the gyroscope output are various photosensitive and electrical components designed to sense and generate an output corresponding to the rotational speed of fiber coil 110. This includes a photodetector 138, an analog signal conditioning device 140, an analog to digital converter (A/D) converter 142, a digital demodulator 144, and a square wave bias modulator 146, where each element is maintained in electrical communication during the processing of the fiber optic gyroscope system output. The function of each of the previously mentioned elements is well known in the art. Consequently, the elements are only briefly discussed below to aid in the understanding of the operation of the fiber optic gyroscope system 100.

Optical directional coupler (e.g., fiber coupler) 116, in receiving electromagnetic waves, or light, at any of its ports, transmits this light so that approximately half of the transmitted light appears at each of the two ports of the coupler 116 on its end opposite that end having the incoming port. On the other hand, no such waves or light is transmitted to the port which is on the same end of coupler 112 as is the incoming light port. For example, light received at port a will be transmitted to ports c and d, but not to port b. Similarly, light received at port c will be transmitted to ports a and b, but will not be transmitted to port d, and so on.

Therefore, during operation, light source 112 transmits a broadband light wave to port a of coupler 116 via optic fiber 114. Fiber coupler 116 splits the transmitted light and provides the light to ports c and d, where the light provided to port d typically may not be used by the gyroscope. The light provided to port c, however is further transmitted to multifunctional integrated optics chip 120 via optic fiber 118, where the light wave is further split at y-junction 132 and provided to waveguides 122 and 130.

The light provided to waveguide 122 is transmitted to fiber coil 110, via optic fiber 124, where it propagates clockwise around the length of fiber coil 110 (hereinafter, "the cw wave"). Similarly, the light wave in waveguide 130 is provided to fiber coil 110 via optic fiber 126, where the light wave propagates counterclockwise around the length of fiber coil 110 (hereinafter, "the ccw wave").

After being transmitted from fiber coil 110 to multifunctional integrated optics chip 120 via optic fibers 124 and 126, respectively, the ccw and cw wave are combined at y-junction 132 before being further provided to port c of fiber coupler 116 via optic fiber 118. As noted above, once the two light waves are provided to port c, the waves are then provided to ports a and b, but not provided to port d.

Port b is further connected to photodetector 138 via optic fiber 136 such that the ccw and cw light waves are received at the photodetector 138, which in turn, provides an output photocurrent i to analog signal conditions unit 140. The value of photocurrent i is proportional to the intensity of the two electromagnetic waves or light waves impinging on the photodetector 138. Therefore, the photocurrent i is expected to follow the cosine of the phase difference between the two waves which impinging on the detector 138.

In the prior art arrangement depicted, the output signal from photodetector 138 may be converted to a voltage and amplified at analog signal conditioning unit 140 (ASC). The output voltage signal may then be further provided to an analog to digital converter 142 where it is converted to a digital signal prior to being passed to PSD/digital demodulator 144. PSD/digital demodulator 144, serving as part of a phase demodulation system, is a well known device. Such a PSD/digital demodulator 144 extracts the amplitude of the fundamental frequency $f_b$ of the photodetector 138 output signal, or the fundamental frequency of modulation signal generator 146 plus higher odd harmonics, to provide an indication of the relative phase of the electromagnetic waves impinging on photodetector 138. This information is provided by PSD/digital demodulator 144, as the output of the gyroscope.

Typically, gyroscopic designers seeking to minimize excess noise (e.g., "relative intensity noise") employ techniques which seek to phase modulate the light counterpropagating within the fiber coil so that the working point for signal measurement is always in the characteristic range of maximum measuring signal change per rotation rate change. That is, designers seeking to maximize the sensitivity of the gyroscope to sensing angular rotations must consider the maximum modulation which can occur for a particular gyroscope configuration, in order to maximize the gyroscope's sensitivity. Various conventional relative intensity noise or excess noise suppression techniques are described in U.S. Pat. No. 6,204,921 issued Mar. 20, 2001 to Strandjord et al., and incorporated herein by reference in its entirety.

Figure 2:
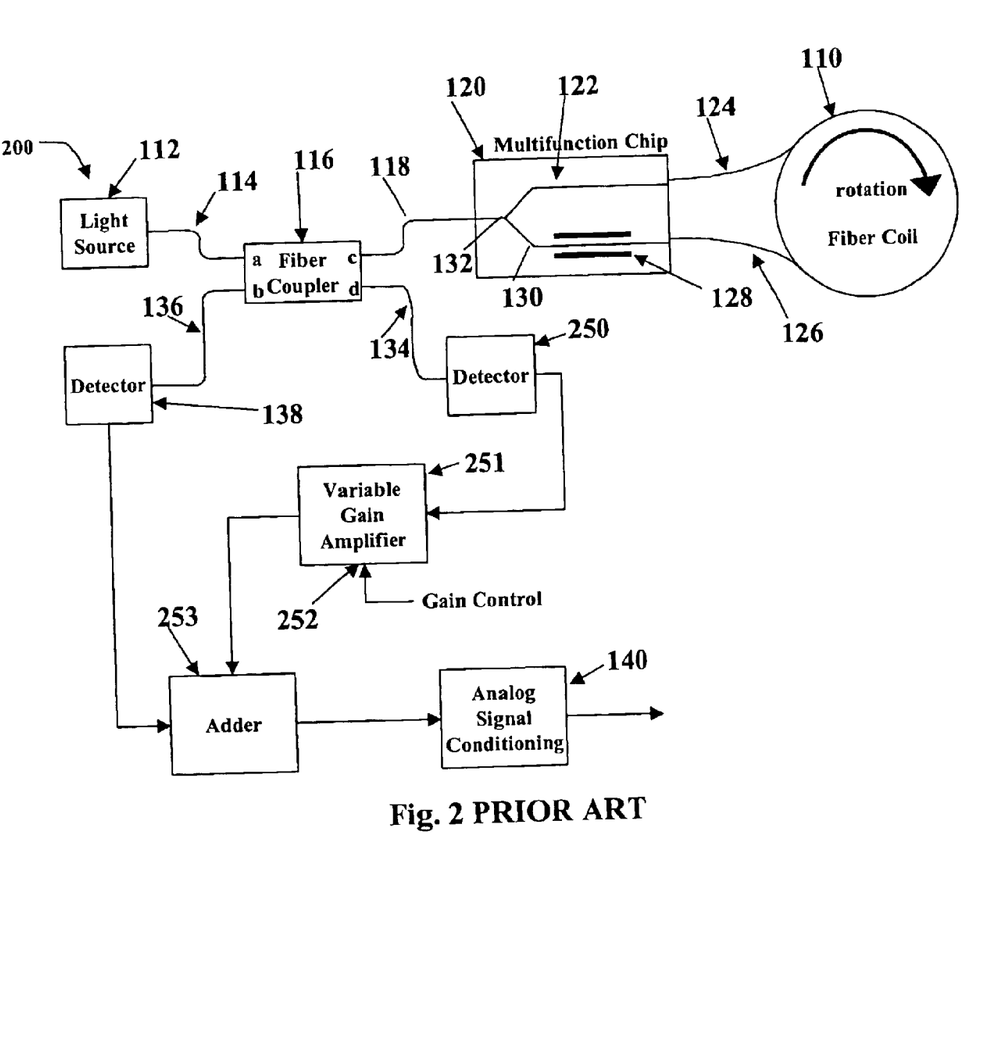
FIG. 2 is a schematic block diagram of a prior art fiber optic gyroscope employing a "subtraction technique" for reducing excess noise.

One type of excess noise reduction technique found in the prior art, called the "subtraction" technique, is illustrated with reference to FIG. 2, in which like character references as that of FIG. 1 indicate similar components of similar operation. Unlike what is depicted in FIG. 1, the portion of the light source 112 directed to port d of coupler 116 is utilized. That is, the light signal which is directed to optical fiber portion 134 is further provided to a second photodetector 250, where the signal is converted into a second photocurrent. The second photocurrent generated by photodetector 250 is further provided to a variable gain amplifier 251, where it is amplified prior to being provided to an analog adder 253.

In similar manner, coupler 116 provides a light signal to a first photodetector 138 via port b and fiber optic fiber portion 136. First photodetector 138 then converts the signal into a first photocurrent which is then provided to analog adder 253. Analog adder 253 may be any conventional adder for combining analog signals. Therefore, at analog adder 253, the first photocurrent and second photocurrent are summed to produce a summed photocurrent for providing to ASC 116.

For ideal optical components, the excess noise observed at first and second photodetectors 138 and 250, respectively, is correlated. That is, for a fiber optic gyroscope operating with a bias modulation at the coil eigen frequency, the excess noise at photodetector 138 occurring at the eigen frequency including odd harmonics will be 180 degrees out-of-phase with the noise at photodetector 250 occurring at the same frequencies. Therefore, by adding a properly gain adjusted signal from photodetector 250 to the signal from photodetector 138, the noise at the output of the adder 253 associated with excess noise will be reduced to zero at the eigen frequency and odd harmonics for a gyro employing ideal components. However, imperfections in real optical components such as polarization crosstalk will limit how much the excess noise is actually reduced.

An additional disadvantage of the "subtraction" technique is that, in order to have a high level of excess noise reduction, the amplitude adjustment of the signal from photodetector 250 must be relatively accurate. In particular, the amount of amplitude adjustment depends on many system parameters, such as, the responsivity of photodetectors 138 and 250, the gain of the amplifier 251, the bias modulation amplitude and optical loss in the wave propagating path from fiber coupler 116 through multifunction chip 122 and fiber coil 110 and back through the fiber coupler 116 to photodetectors 138 and 250. Moreover, it is important to note that these systems' error in amplitude adjustment will increase as the system parameters change over time with the aging of the gyro.

The change in system parameters becomes even more pronounced in systems employing high performance fiber optic gyroscopes, such as space applications which are exposed to radiation or submarine navigation applications which encounter an aging mechanism in the coil fiber that causes increased optical loss over time. In those systems, the amplitude adjustment made on the signal from detector 250 must typically be updated in order to track the drift which often readily occurs with regard to the noted system parameters. Consequently, the updating of the parameters is typically done by using a variable gain amplifier where the gain control 252 is adjusted based on a ratiometric measurement of the light detected at the photodetectors 138 and 250. As should be understood, the variable gain amplifier and circuits used to perform the ratiometric measurements adds undesirable complexity to the design and operation of the gyroscope.

It should be noted, however, that the disadvantages inherent in the "subtraction" technique may typically be overcome by implementing an excess noise servo. In general, employing an excess noise servo typically involves providing a portion of the superfluorescent fiber light source to the servo, which, in turn, uses the provided light to control the light source pump current (e.g., negative feedback). In this way, the light output intensity of the superfluorescent fiber light source becomes a function of the pump current, such that, random fluctuations in the intensity of the light output may be cancelled by applying the appropriate changes in pump current levels.

However, where a high performance fiber optic gyroscope used erbium fiber, it was believed that using the subtraction technique with servo control was impracticable. That is, it should be understood that the typical bias modulation frequency $f_b$ of conventional high-performance fiber optic gyroscopes may be around 20 kHz to 50 kHz. In addition, one skilled in the art will understand that the fundamental demodulation frequency of a conventional high-performance fiber optic gyroscope may be the same as the bias modulation frequency. As shown by equation (1) below, the demodulator output noise depends on the input noise at the fundamental frequency and odd harmonics. Therefore, a careful inspection of equation (1) reveals that to reduce the effect of excess noise on angle random walk, the excess noise is typically reduced at the demodulation frequency fundamental, 3 rd and 5 th harmonics.

$$\sigma_{out} = R_f G_A B \sqrt{\sum_{i=0}^{\infty} \left( G_f[(2i+1)f_b] \frac{1}{2i+1} i_n[(2i+1)f_b] \right)^2} \quad (1)$$

For high performance erbium fiber optic gyroscopes, however, it was believed that reducing the excess noise of the gyroscopic system at the demodulation fundamental, 3 rd and 5 th harmonics was impracticable because the upper state lifetime of the erbium fiber (e.g., erbium atoms) would limit how fast the output light could be controlled. That is, previously, fiber optic gyroscope designers thought that after about 100 hertz, the frequency response of the erbium fiber would be ineffectual for controlling the excess noise output of the gyroscope via the pump current. Moreover, it was believed that the light output of the erbium fiber light source couldn't be controlled fast enough to manage intensity variations in the 20 kHz to 50 kHz range. Furthermore, the designers believed that the bandwidth within which an excess noise servo could operate in a system using erbium doped optical fiber would be limited to less than 100 Hz.

Recent experimentation on the frequency response of erbium fiber, however, has yielded different and unexpected results. Namely, it was discovered that the frequency response of the erbium fiber after the cutoff frequency was suitable for use in fiber-optic gyroscope technology in that the roll off after the cutoff frequency permitted increased control of the relative intensity noise servo. For example, it was discovered that after the cut-off frequency of the erbium fiber (e.g., the 3 kHz cutoff frequency, when a pump intensity power was provided from the pump at a wavelength of 1480 nm, and this was provided to the erbium fiber which emitted light at a wavelength of 1550 nm), the intensity rolloff of the pump-erbium fiber combination was only 6 db/octave, which made it manageable to construct a stable control loop. If the rolloff was too high, then the control loop would not be useable. Consequently, it was discovered that the unexpected characteristics of the erbium fiber allows construction of a relative intensity noise servo with a bandwidth of at least 100 KHz to 500 kHz. This, in turn, provides a noise reduction realization of a factor of 4 at the output of the fiber optic gyroscope demodulator.

Until now, the use of the properties of the erbium fiber to enhance the gain in the fiber optic system has gone untried because of the erroneous belief that the relatively long upper-state life-time of the erbium atoms would limit any control of light intensity to well below 1 kHz. Hence, a need existed for a system for use in reducing the excess noise of gyroscopic system at the demodulation fundamental, 3 rd and 5 th harmonics which allows additional control of the angle random walk and relative intensity noise by capitalizing on the gain provided the gyroscope by the erbium fiber. Presently known control methods for controlling excess noise gyroscopes using erbium remain inadequate, particularly in their ability to limit excess noise and provide pump current control at low frequencies.

SUMMARY OF EXEMPLARY EMBODIMENTS OF THE INVENTION

Various embodiments of methods and systems are provided for reducing relative intensity noise in a high performance fiber optic gyroscope, which addresses many of the shortcomings of the prior art. Particularly, various methods and systems are provided for reducing the excess noise present in a erbium-doped fiber optic gyroscope by manipulating the intensity of the light provided by an erbium-doped light source in response to the gain attributable to the gain characteristics of the erbium-doped fiber.

In accordance with various aspects of the system, the present invention provides a system for suppression of relative intensity noise in a fiber optic gyroscope in which the system takes advantage of the frequency response of an erbium fiber to control variations in pump current, and thus control fluctuations in the gyroscopic light source. Particularly, various embodiments use the erbium fiber frequency response to facilitate a stable control loop feed back design for controlling the pump current. More particularly, the invention takes advantage of the recent discovery that the frequency response of erbium fiber above 3 kHz closely mimics an integrator with a 6 dB/octave rolloff, which allows for a relative intensity noise control loop with a bandwidth much greater than 3 kHz. With this type of frequency response, a stable loop with positive gain in the frequency range of 20 kHz to 200 kHz, or higher, is provided.

In accordance with one exemplary aspect, a portion of the erbium fiber light source (e.g., "light signal") is provided to a photodetector for detecting the fluctuations in the light intensity of the erbium light source. The photodetector converts the light signal into an electrical signal prior to the signal being amplified. A constant direct current (dc) signal is impressed upon the amplified signal and then the combined signal is further provided to the current control input of a pump injection current driver, the output of which is the injection current supplied to the pump laser for conversion into optical power. The optical power is then provided to the erbium fiber light source which, in turn, causes the erbium fiber to emit light at a wavelength representative of a nominal intensity level.

In accordance with another aspect of the invention, the fluctuations in light intensity caused by the existence of excess noise or relative intensity noise is reduced via a control loop in which the amount of reduction is a function of the open loop gain of the control loop. The open loop gain of the control loop is enhanced by the additional gain provided to the loop due to the erbium fiber.

In accordance with yet another aspect of the invention, a servo control is provided to facilitate the control of the intensity fluctuations of an erbium-doped light source in response to the gain to the overall system attributable to the erbium-doped light source.

BRIEF DESCRIPTION OF DRAWINGS

A more complete understanding of the present invention may be derived by referring to the various exemplary embodiments of the present invention which are described in conjunction with the appended drawing figures in which like numerals denote like elements.

DETAILED DESCRIPTION OF VARIOUS EXEMPLARY EMBODIMENTS

The present invention may be described in terms of functional block components and various processing steps. Such functional blocks may be realized by any number of hardware and/or software components configured to perform the specified functions. For example, the present invention may employ various integrated circuit or optical components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, optical configuration, signal processing and/or control, data processing and the like.

The particular implementations shown and described herein are illustrative examples of the invention and are not intended to otherwise limit the scope of the invention in any way. Indeed, for the sake of brevity, conventional electronics, control systems, optics, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical sensor device. Moreover, no item or component is essential to the practice of the invention unless the element is specifically described as "essential" or "critical".

Furthermore while the invention is described in terms of high performance gyroscopes, it is to be understood that the invention is not so limited. For example, to facilitate the understanding of the invention, the invention may be described in terms of various conventional fiber optic systems such as, temperature sensors, strain sensors and/or magnetometers or like sensors using erbium fibers. Typical gyroscope system technology which may benefit from this invention includes, for example, those gyroscopes described in U.S. Pat. No. 5,767,968, issued Jun. 16, 1998 to Strandjord, U.S. Pat. No. 5,781,300 issued Jul. 14, 1998 to Strandjord, et al., and U.S. Pat. No. 5,999,304 issued Dec. 7, 1999 to Sanders, et al. (all of which are incorporated herein by reference in there entirety), all of which are contemplated to be well within the scope of this invention.

According to various exemplary embodiments of the invention, a fiber optic sensor (and an associated method of operation) is produced that provides a highly reciprocal light path for two or more light beams in a gyroscope. The paths taken by the various beams propagating through the optical portion of the sensor may be identical except for a portion of the optical circuit that induces a modulation between the beams. Any of the various conventional techniques (such as manufacturing techniques, modulation techniques and signal processing techniques) that have been used in conjunction with interferometric sensors (such as interferometric fiber optic gyroscopes) may be used in conjunction with the present invention. Moreover, bulk optics components (couplers and the like) may be substituted for any of the components described herein in various alternate embodiments.

Furthermore, while the exemplary embodiments are described, with respect to various amplifiers, and various circuits which effect a higher gain and thus a more sensitive frequency response, such circuitry may comprise any suitable controls for use in a feedback circuit.

With respect to the use of a servo for controlling excess noise, or relative intensity noise in a fiber optic gyroscope, the bandwidth of the servo, as determined by the frequency response to variations in pump power, was thought to be limited to about 3 kHz because of the presence of the erbium doped optical fiber included in light source 112. However, FIGS. 4A, 4B, 5A and 5B and the description below illustrate a more accurate depiction of the erbium frequency response above 100 Hz. That is, as can be seen, the upper state life time of the erbium atoms has a far different response than was previously believed by gyroscope designers. In order to aid in the full understanding of the benefit of the recently discovered erbium frequency response, an exemplary fiber optic gyroscope system using erbium and employing a feedback loop for controlling light fluctuations is described below with respect to the variously included Figures.

Figure 3:
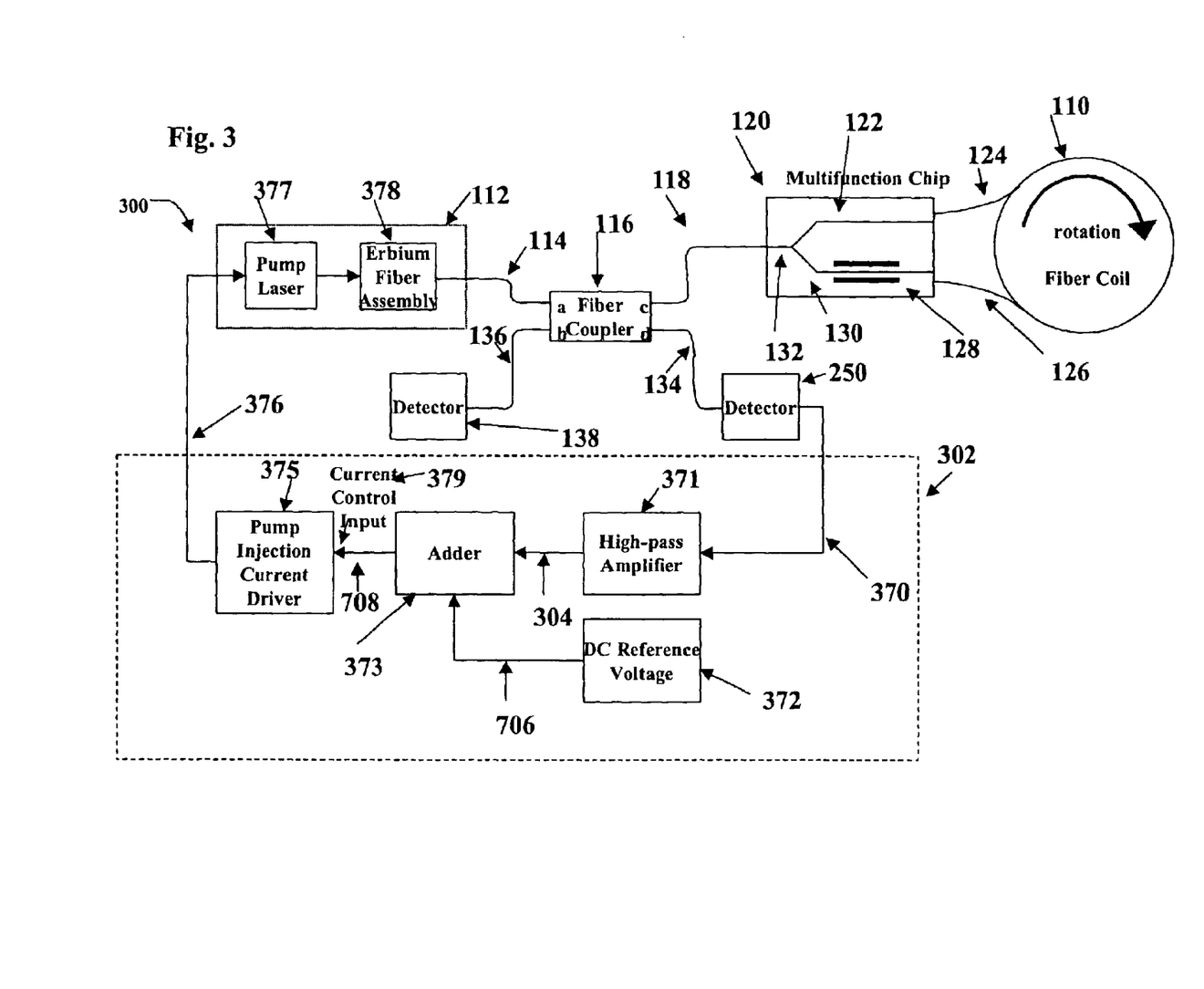
FIG. 3 is a schematic block diagram depicting the use of a negative feedback to the pump laser for controlling light source intensity.

FIG. 3 is a block diagram of an exemplary embodiment of a fiber optic gyroscope (FOG) in which a fiber optic gyroscope system 300 includes negative feedback to the pump laser 377 via pump injector current driver 375. The technique of using "negative feedback," typically requires that part of the signal being produced by the fiber optic gyroscope is fed back and compared with the signal produced by the light source 112. In this way, distortions introduced into the fiber optic gyroscope system may typically be precorrected and largely eliminated. As a result, the fiber optic gyroscope system may be made almost distortionless, despite fluctuations in the power supply and performance of electronic components.

With respect to FIG. 3, an exemplary fiber optic gyroscope system 300 using a negative feedback suitably includes a light source 112, a fiber optical coupler 116, a multifunctional integrated optical chip 120, a fiber coil 110, first and second photodetector circuits 250 and 138, respectively, and a servo control 302. Servo control 302 further includes a frequency filter (high pass amplifier) 371, a dc reference voltage 372, an adder (e.g., summer) 373, and a pump injection current driver 375. Light source 112 further includes a pump laser 377, and an erbium fiber assembly 378.

Like elements as those described with reference to FIGS. 1, 2 and 3, have similar construction and/or operation. In addition, photodetector 138 may be connected to any suitable system for providing a gyro output signal, such as the systems previously depicted with reference to FIGS. 1 and 2, which may include various ASCs, A/D converters, modulators, demodulators, and the like. Moreover, light source 112 may be suitably coupled to fiber coupler 116, and fiber coupler 116 may be suitably coupled to photodetectors 138 and 250 in a similar manner as was described with reference to FIGS. 1 and 2. Furthermore, fiber coupler 116 may be coupled to a multifunctional integrated chip including a y-junction 132, and to gyroscopic coil 110, via an optical fiber 118, as was also depicted in FIGS. 1 and 2.

Optical fibers (such as fibers 114, 118, 124, 126, 134 and 136) interconnecting the various components in fiber optic gyroscope system 100 may be any sort of optical fiber capable of directing light between the components. In various embodiments, the optical fibers are single mode fibers capable of directing a single optical mode such that various filters are not required in fiber optic gyroscope system 300 to isolate desired modes for signal processing. Optical fibers may also be polarization maintaining fibers, particularly in embodiments that do not include a polarizer in the optical circuit (such as the embodiment shown in FIG. 3). A polarizer may be included in the fiber assembly. If polarization maintaining optical fiber is not used, various alternate embodiments might include an optical polarizer anywhere in the optical circuit such as in integrated optics chip 120 or between coupler 116 and optics chip 120.

Coupler 116 may be any coupling device capable of joining optical signals propagating on separate fibers. Exemplary couplers include conventional 2×2 couplers available from the Gould Electronics in Millersville, Md., as Model PM-10055-052UV01. Alternatively, fibers 114 and 136, and/or 118 and 134 may be joined to form a coupler by stripping the cladding off of each fiber in the relevant position for the coupler, placing the two fiber cores together, and melting the cores together with the application of heat and optional tensile pressure.

Multifunctional integrated optics chip (IOC) 120 suitably includes a y-junction 132 and at least one modulator 128. In various embodiments, multifunctional integrated optics chip 120 is formed from lithium niobate (LiNO3) or another material that affects the speed of light in response to an applied electric potential. Alternatively, multifunctional integrated optics chip 120 may be any conventional optical splitter/modulator combination such as a model 10022250 available from the JDS Uniphase corporation of Bloomfield, Conn. Multifunctional integrated optics chip 120 suitably includes a waveguide (shown as solid lines in integrated optics chip 120) for guiding light from source 112 through the chip. The path may include a y-junction 132 that splits light from coupler 116 into two paths 122 and 130. Y-junction 132 may also re-combine light received upon paths 122 and 130, as appropriate. One or more optical phase modulators 128 (which may be implemented as electrodes in multifunctional integrated optics chip 120 near paths 122 and/or 130) may also be provided to produce phase shifts in light passing through paths 122 and 130, respectively, in response to modulation signals produced by phase modulator 128. In various alternate embodiments and as described more fully below, multifunctional integrated optics chip 120 may be replaced with different but equivalent components such as couplers, splitters, modulators (such as piezoelectric modulators) and the like.

Photodetector 250 is further connected to a negative feedback loop 302 for providing a pump laser error signal to light source 112 via an optical fiber 376. In one exemplary embodiment, feedback loop 302 suitably includes a high-pass amplifier 371 electrically coupled to a photodetector 250, a dc reference voltage 372, an adder 373 electrically coupled to high-pass amplifier 371 and dc reference voltage 372, and a pump injection current driver 375 electrically coupled to adder 373 and to light source 112. In accordance with various embodiments light source 112 may be of similar operation as described with respect to FIG. 1.

In accordance with various embodiments, high-pass amplifier 371 may be an operational amplifier with an input capacitor/resistor parallel combinations and a feedback resistor. DC reference voltage 372 may be any source capable of providing a suitable reference voltage (e.g. 2.5V) for adding to the output of high pass amplifier 371. Adder 373 may be any element capable of combining at least two electrical signals and providing a summed electrical signal. For example, adder 373 may be a digital or analog summer, such as, for example, two resistors with a common connection to a summing junction of an operational amplifier. Pump injection current driver 375 may be any current driver capable of providing a current signal to pump laser 377. A typical pump injection current driver for use with various embodiments may typically consist of an operational amplifier, and a power transistor with several resistors and capacitors. Since the construction of a typical pump injection current driver is well known in the art, it will not be discussed in detail.

Light source 112 may be any typical light source employing erbium doped fiber assembly 378 and a pump laser 377 for controlling the intensity of the light emitted by the light source 112. A typical source for use with various embodiments is described in "Erbium-Doped Fiber Amplifiers", (John Wiley & Sons, Inc., NY) 1994, incorporated herein by reference.

In one exemplary embodiment, feedback loop 302 suitably may include any processing circuitry capable of receiving the output of photodetector 250 and calculating a feedback signal for providing to light source 112. For example, feedback loop 302 may include any conventional microprocessor, microcontroller, digital signal processor, programmed array logic (PAL), application specific integrated circuit (ASIC), any suitable signal filtering system, summer or injection driver, and the like, suitable for calculating fiber optic output and feedback signal.

In another exemplary embodiment, negative feedback loop 302 further includes a high-pass filtering system 371 coupled to photodetector 250 via electrical connector 370, and to an adder 373 via connector 304. Adder 373 is further connected to a system for providing a dc reference voltage 372 via connector 706, and to pump injection current driver 375 via connector 708. In addition, pump injection current driver 375 is further connected to the pump laser 377 of light source 112 via connector 376.

Photodetectors 138 and 250 may be any circuit capable of detecting the intensity (i.e., amplitude) of light emanating from fibers 136 and 134. In various embodiments, photodetector circuits 138 and 250 suitably include a photodiode that conducts an electric current in response to the intensity of incident light, and the photodetectors may also include a trans-impedance amplifier. Photodetector circuits 138 and 250 may also include circuitry or other components to generate a digital or analog signal that is provided to any of an ASC 140, amplifier 251, or the like, as appropriate. Numerous conventional photodetector circuits 138 and 250 have been developed for use with fiber optic gyroscopes or other sensors that may be applicable to sensor 100. In various embodiments, photodetectors 138 and 250 may consist of FET transistors, an operational amplifier, resistors and capacitors, and a photodiode. An example of a photodiode which may be used with this invention includes model EXT300T available from JDS Uniphase of West Trenton, N.J. Photodetectors 138 and 250 response may be dependent upon the wavelength of incident light. Consequently, photodetectors 138 and 250 may be selected to correspond to the wavelength of light propagating through fiber optic gyroscope system 300.

Various embodiments of signal feedback and filtering have been disclosed in conjunction with various fiber optic gyroscope devices, and any fiber optic gyroscope electronics scheme could be readily adapted for use in sensor 300. For example, system 300 may suitably integrate signal filtering and processing into photodetector 250 to produce a conditioned output signal. The embodiment shown in FIG. 3 may be operated in a feedback driven (or "closed loop") configuration, as well as a non-feedback driven (or "open loop") configuration that generates a modulation signal without regard to the output of photodetector 250.

During operation, photodetector 250 provides an electrical signal representing the intensity of light impinging on the photodetector 250 to high-pass amplifier 371. High-pass amplifier 371 amplifies the electrical signal with a gain of unity to 100 prior to providing the signal to adder 373. The amount of gain depends on various factors such as the coupling ratio of the coupler 116, the voltage to current gain of the pump current driver 375 and the efficiency of the light source 112. DC reference voltage element 372 further provides a dc reference voltage of about 2.5V to adder 373. Adder 373 sums the signals provided by the high-pass amplifier 371 and the dc reference voltage element 372, into a summed signal for providing to the pump injection current driver 375 via the current control input 379. The pump injection current driver 375 may typically convert the summed signal into a current signal for use in controlling the pump laser of light source 112.

The summed signal is further provided to the current control input 379 of pump injection current driver 375, where it is further provided to pump laser 377 of light source 112. The pump laser 377 generates an optical power which is provided to (e.g., "injected into") the erbium fiber of the erbium fiber assembly 378. The light from the pump laser 377 causes the erbium fiber to emit light at a wavelength that is different than that of the pump light. That is, the erbium fiber emits light whose wavelength is, e.g., 1550 nm.

Fluctuations in light intensity at detector 250 are reduced by gain of the control loop formed by the high-pass amplifier 371, adder 373, pump injection current driver 375, light source assembly 112, fiber coupler 116 and detector 250. Moreover, in a typical embodiment, the amount of reduction suitably depends in part on the open loop gain of the control loop. That is, the greater the open loop gain at a particular frequency, the greater the reduction of intensity fluctuations at that frequency. This is in part because the higher loop gain increases the embodiments sensitivity to low frequency rotation such that the gyroscopic rotation may properly be evaluated with little signal fluctuation.

Figures 6A, 6B:
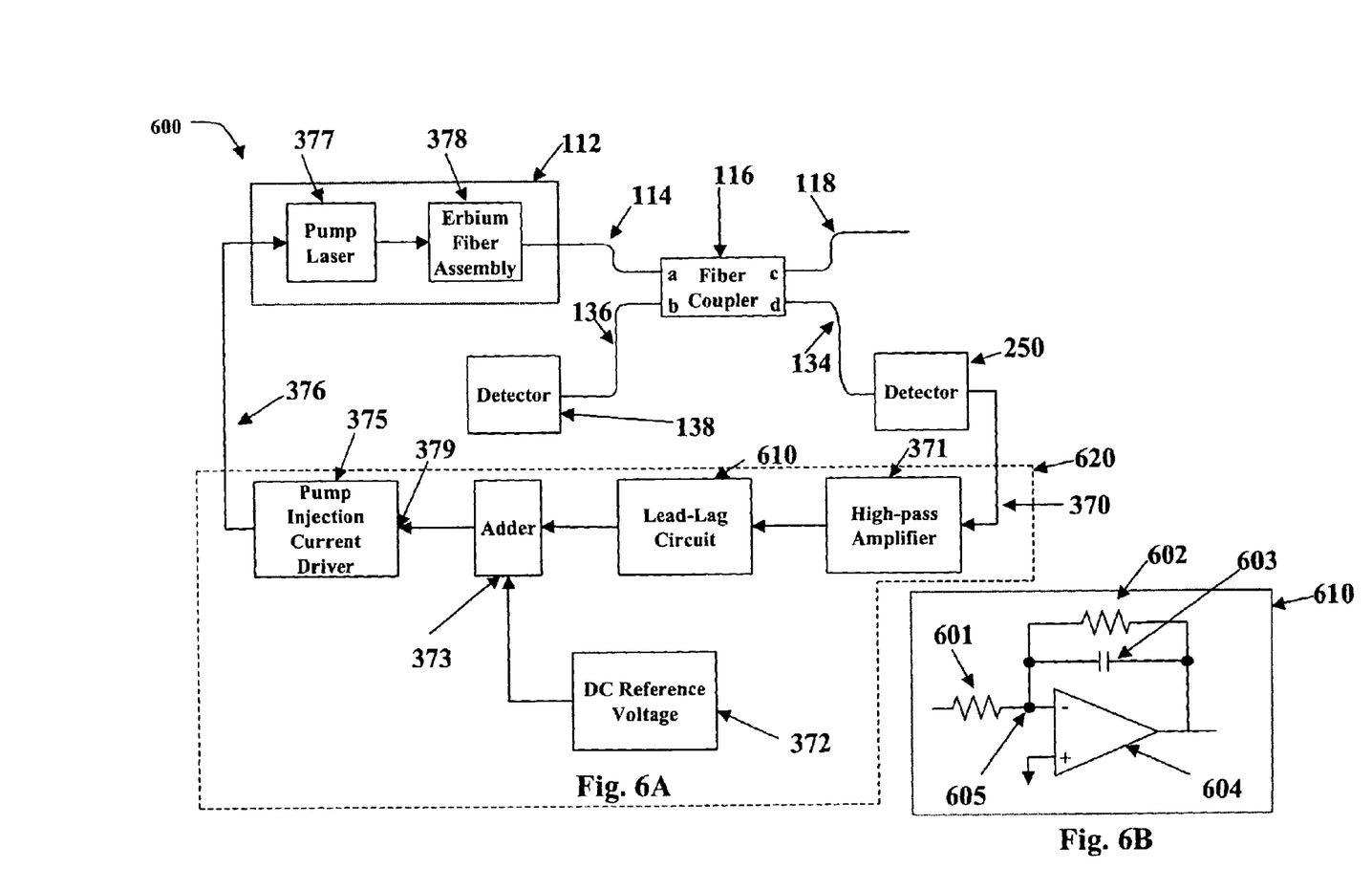
FIGS. 6A–6B are schematic diagrams of an alternate method for excess noise control loop utilizing a lead-lag circuit.

Additional open loop gain, and thus additional noise reduction, can be realized by employing a second-order negative feedback loop 620. FIG. 6A is a block diagram of another exemplary embodiment of a fiber optic gyroscope using negative feedback to pump laser 377 via pump injector current driver 375 and in which a second order negative feedback loop is used. The circuit depicted in FIG. 6A is substantially the same as the circuit shown in FIG. 3, such that like elements of FIG. 3 and FIG. 6A have substantially similar operation and performance. However, FIG. 6A includes a lead-lag circuit 610 which may be positioned between the high-pass amplifier 371 and adder 373.

Lead lag circuit 610 may be of any conventional construction for allowing a stable feedback loop with higher loop gain, which results in more noise reduction above the circuit depicted in FIG. 3. FIG. 6B shows an exemplary lead-lag circuit for use with FIG. 6A, however, other suitable circuits may be used. In one particular embodiment, lead-lag circuit 610 may include a resistor 602 connected in parallel with a capacitor 603 and a load resistor connected to the negative terminal 605, of operational amplifier 604. The values of capacitor 603 and resistor 602 may be of a suitable value for controlling the time constant of the circuit 610. For example, the values of the capacitor 603 and the resistor 602 may be chosen to suitably control the frequency response of the circuit 610 (e.g., time constant=resistance times capacitance).

The construction and operation of lead-lag circuits is well known. As such, the construction and operation of lead-lag circuit 610 is not discussed in detail. While the lead lag circuit 610 is depicted using discrete elements, the circuit 610 may be implemented using any suitable lead-lag circuitry, such as, for example, any integrated circuit, software implementation or the like.

As mentioned previously, gyroscope designers have attempted to increase the bandwidth of the servo beyond 3 kHz by increasing the overall gain of the loop to be much greater than unity at increasingly higher frequencies. Because it was thought, however, that increasing the gain past the current limits of a utilized current pump would saturate the pump with current noise, it was further believed that the bandwidth of the servo in a system using erbium fiber would be limited to about 100 Hz. However, as is shown in FIGS. 4A–B and 5A–B, the frequency response of the erbium fiber allows the addition of gain to the feedback system such that the bandwidth of the servo can be increased well above 100 Hz, even at frequencies higher than 3 kHz. This, in turn, provides for an increase in the level of open loop gain at frequencies higher than 3 kHz in contrast to prior art solutions. That is, by taking advantage of the erbium frequency response, a high performance gyroscope designer may increase the gain of the overall feedback system, and thus allowing for greater circuit response to excess noise are or relative intensity noise.

Figure 4A:
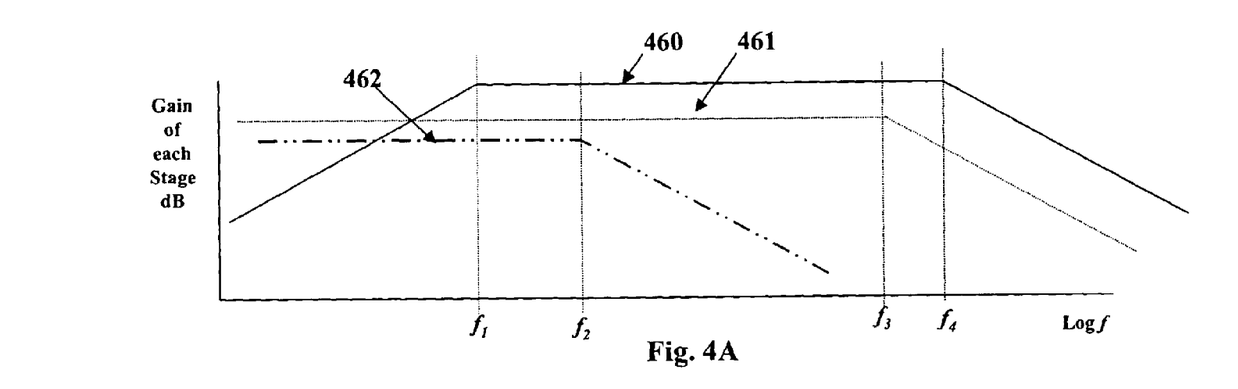
FIGS. 4A–4B are Bode plots illustrating the open loop gain versus frequency of the major components that make up an excess noise control loop.
Figure 4B:
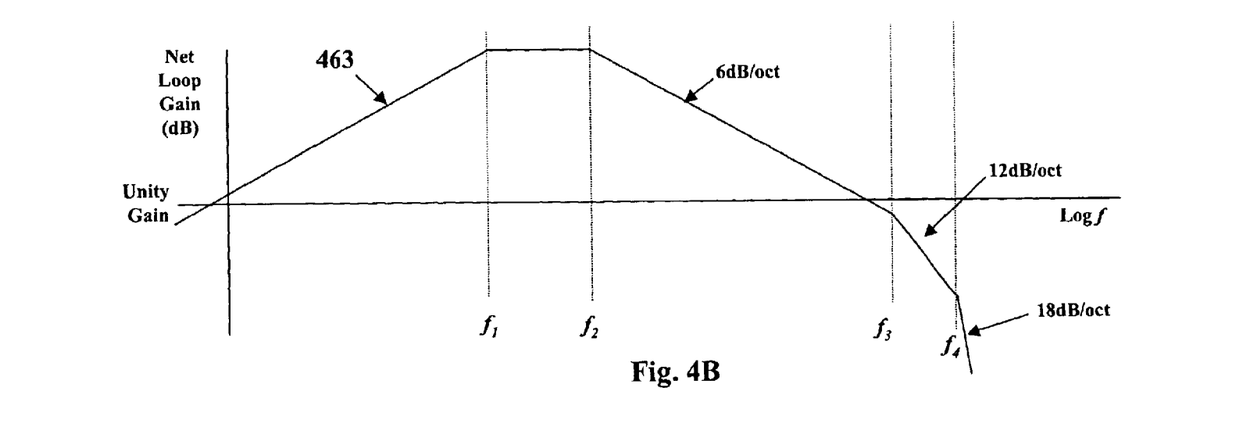

FIGS. 4A–4B depict typical Bode plots showing the open loop gain of a simple excess noise servo, such as the ones depicted in FIGS. 3 and 6A–B. In particular, FIG. 4A depicts the gain which occurs during various stages of the control loop. For example, curve 460 is a typical Bode plot of the gain of high-pass filter 371 used in the invention, which has a lower cutoff frequency of $f_1$ and an upper cutoff frequency of $f_4$, where $f_1$ may be from about 1 Hz to 100 Hz and $f_4$ may be from several hundred kilohertz or higher. In addition, curve 461 is a typical Bode plot of the gain of the photodetector 250, which may typically have a low-pass cutoff frequency of $f_3$, which is typically from several hundred kilohertz or higher. Furthermore, curve 462 is a Bode plot of an exemplary gain of the erbium fiber light source, which has a low-pass cutoff frequency of $f_2$, typically from about 1 kHz to 3 kHz.

As noted above, the frequency response of the erbium fiber is a function of the upper state life time of the erbium atoms, and further, as shown by curve 462, the erbium fiber frequency response is such that when combined with the frequency responses of the high-pass filter 371 and the detector 250, does not cause the pump laser to saturate with noise current. That is, as can be seen by curve 463 of FIG. 4B, which depicts the net (e.g., sum total) open loop gain of the simple excess noise control loop of FIG. 3, the frequency response of the erbium fiber suitably allows a loop gain roll-off of about 6 dB/octave in the region of unity loop gain. Consequently, by including the gain attributable to the erbium fiber, the frequency response of the loop is made stable. Furthermore, in typical gyroscope designs using negative feedback to control the light source intensity, the loop gain may typically be limited such that the unity gain frequency is less than the cutoff frequency $f_3$ of photodetector 250. That is, since the photodetector 250 typically demonstrates a frequency roll-off at about $f_3$, the frequency response of the photodetector 250 with respect to the other electronic components in the feedback loop (e.g., adder pump injection current driver, high-pass filter and the like) will typically limit how much noise reduction is realized.

Figure 5A:
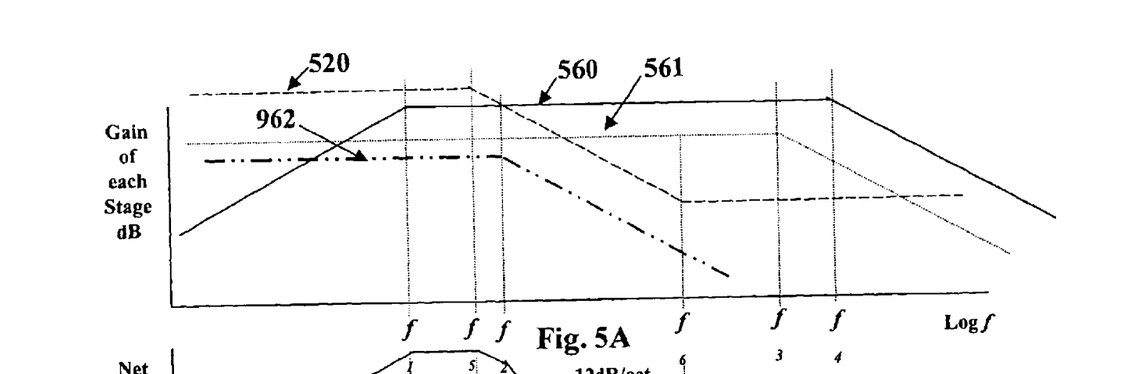
FIGS. 5A–5B are Bode plots illustrating the open loop gain versus frequency of the major components that make up an excess noise control loop utilizing a lead lag circuit.
Figure 5B:
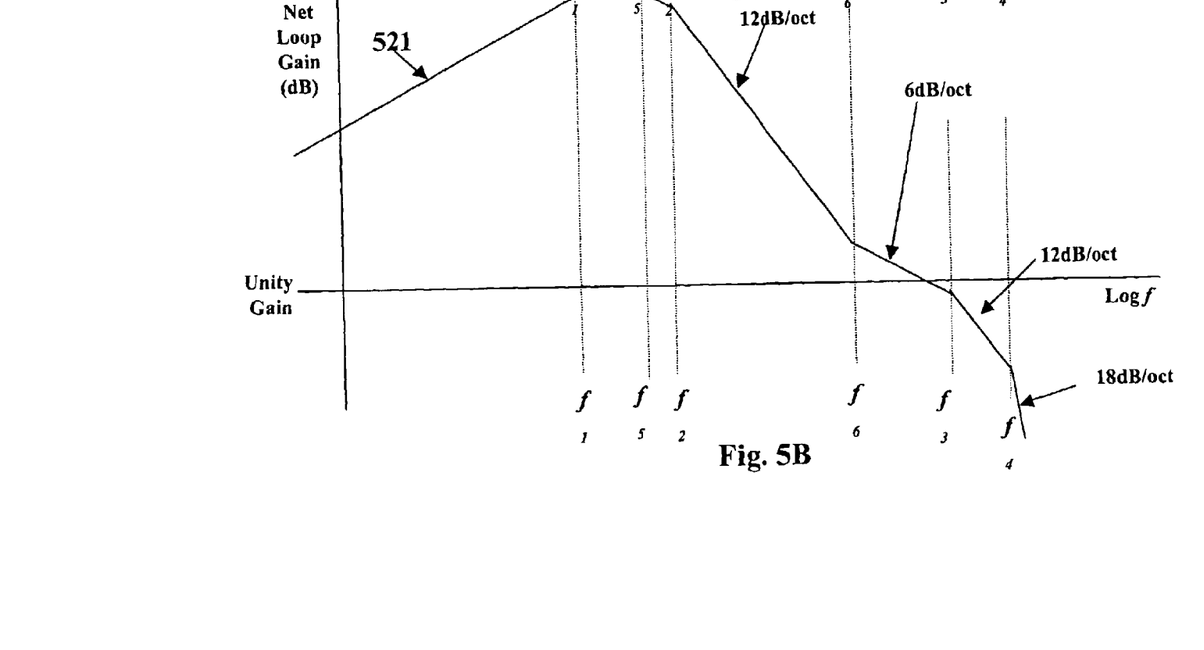

With respect to FIGS. 5A–B, Bode plots show the open loop gain of the second-order feedback loop 620 shown in FIGS. 6A–B. In particular, FIG. 5A shows the gain of various stages of the control loop of FIGS. 6A–B, such that curve 560 is a typical Bode plot of the gain of high-pass filter 371 used in the invention, which has a lower cutoff frequency of $f_1$ (e.g., from about 1 Hz to 100 Hz) and an upper cutoff frequency of $f_4$ (e.g., from several hundred kilohertz or higher). Further, curve 561 is a typical Bode plot of the gain of the photodetector 250, which may typically have a low-pass cutoff frequency of $f_3$ (e.g., from several hundred kilohertz or higher). Further still, curve 962 depicts a Bode plot of the gain of the erbium fiber light source, which has a low-pass cutoff frequency of $f_2$ (e.g., from about 1 kHz to 3 kHz). In addition, curve 520 is a typical Bode plot of the gain of the frequency response of the lead-lag circuit 610 shown in FIGS. 6A–B. Further still, curve 521 of FIG. 5B is a typical Bode plot of the over-all gain of the second-order control loop of FIG. 6A.

It should be understood that by introducing the lead-lag circuit 610, higher gain below the photodetector 250 cutoff frequency $f_3$ may be obtained. Since the frequency response of the feedback loop will be second order, the lead-lag circuit gives higher gain at lower frequency, but has a flat frequency response above $f_6$. As long as $f_6$ is chosen correctly, the flat frequency response ensures that the control loop remains stable. The lead-lag circuit does not increase gain between $f_6$ and $f_3$, but does increase gain below $f_6$. Moreover, by introducing the lead-lag circuit, there is a faster rise (12 dB/octave) in gain with lower frequency below $f_6$ (e.g., from about 100 kHz to 1 MHz). One skilled in the art will recognize that the frequency $f_6$ depicts frequency where the roll-off the lead-lag circuit stops and is determined by the value of resistor 602 and the value of capacitor 603 in FIG. 6A, which offer the time constant of the lead-lag circuit in FIG. 6B (e.g., time constant=R×C). That is, after the frequency $f_6$ and through the unity gain frequency, the open loop roll-off is 6 dB/octave, and therefore allows for a stable loop.

Fiber optic gyroscopes have been described above with reference to various exemplary embodiments. However, those skilled in the art will recognize that changes and modifications may be made to the exemplary embodiments without departing from the scope of the present invention. For example, the various operational steps, as well as the components for carrying out the operational steps, may be implemented in alternate ways depending upon the particular application and/or polarization state of the light source (e.g., polarize or unpolarized) or in consideration of any number of cost functions associated with the operation of the system, e.g., various components may be deleted, modified, or combined with other components such as providing a detector with a suitable high-pass frequency response, or a frequency filter unit with a suitable high-pass, lead-lag response. Use of a rare earth element other than erbium that shares similar properties may also be utilized in the invention.

In addition, where the light source is polarized, the invention may be included in the fiber optic gyroscope system along with the structure necessary to support such polarization.

Additionally, while the relative intensity noise suppression system is described above is suitably for suppressing excess noise in a fiber optic gyroscope, the system may also be used in any system in which it is beneficial to increase the over-all system loop gain by including the gain provided by an erbium fiber, such as other fiber optic sensors that measure current, magnetic field, strain and pressure.

Furthermore, while the gyroscopic system of the present invention has been described in an "open loop" gyro configuration, the invention is not to be so limited. For example, with the addition of electronics necessary to convert the signal at detector 138 to a rotation signal, this system may be described in a closed loop configuration. Such electronics may involve conventional methods for conditioning the signal at detector 138 and then providing a feedback signal to multifunction chip 120 to sum with the signal at detector 138. The amount of feedback provided may be a function of the rotation rate of the gyro. Conversion of an open loop gyroscopic system to a closed loop system is well understood and, as such, although contemplated to be within the scope of the this invention, the particulars of the conversion will not be discussed herein for brevity.

These and other changes or modifications are intended to be included within the scope of the present invention, as set forth in the following claims.

What is claimed is:

1. A system for suppression of relative intensity noise in a fiber optic gyroscope comprising:
   an erbium-doped broadband light source arranged to generate a light output, wherein the erbium-doped broadband light source comprises a pump laser and a fiber assembly, the pump laser configured to provide a pumped laser signal to the fiber assembly so as to control an intensity of the light output;
   a fiber tap coupler coupled to receive the light output and arranged to sample a part of the light output to provide a first sampled signal, and to receive the intensity modulated light and to sample a part of it to provide a second sampled signal;
   a first photodetector coupled to sense the first sampled signal, to detect its intensity, and to convert the first sampled signal to a first detected signal having a voltage proportional to an intensity of the first sampled signal;
   a second photodetector arranged to sense the second sampled signal and to detect the intensity fluctuations of the second sampled signal;
   a pump injection current driver arranged to provide a control signal to the pump laser; and
   a servo control responsive to the first detected signal, the servo control being arranged to generate an error signal to cause the pump injection current driver to provide an injection current signal to the pump laser for varying the pump laser signal provided to the fiber assembly which causes the light source to cancel out intensity fluctuations of the light output at the second photodetector, in order to thereby suppress the relative intensity noise, the servo control being configured to have a maximum power gain at a frequency at or above a bias modulation frequency, wherein the tap coupler, the first photodetector, the pump injection current driver, the pump laser and the servo control comprise a feedback loop which utilizes negative feedback to control the intensity fluctuations, and wherein the servo control comprises a voltage amplifier comprising characteristics such that an open loop gain of the feedback loop is responsive to a gain provided by the erbium-doped broadband light source.

2. The system according to claim 1, wherein at least one of the first photodetector and the second photodetector comprises a photodiode and a trans-impedance amplifier.

3. The system according to claim 1, wherein logic of the servo control has a bandwidth of at least 200 kHz.

4. The system according to claim 1, wherein the fiber assembly comprises a polarizer.

5. The system according to claim 1, wherein the servo control is configured to have a maximum power gain at a frequency that is an odd harmonic of the bias modulation frequency.

6. A system for suppression of relative intensity noise in a fiber optic gyroscope comprising:
   an erbium-doped broadband light source arranged to generate a light output, wherein the erbium-doped broadband light source comprises a pump laser and a fiber assembly, the pump laser configured to provide a pumped laser signal to the fiber assembly so as to control an intensity of the light output;
   a fiber tap coupler coupled to receive the light output and arranged to sample a part of the light output to provide a first sampled signal, and to receive the intensity modulated light and to sample a part of it to provide a second sampled signal;
   a first photodetector coupled to sense the first sampled signal, to detect its intensity, and to convert the first sampled signal to a first detected signal having a voltage proportional to an intensity of the first sampled signal;
   a second photodetector arranged to sense the second sampled signal and to detect the intensity fluctuations of the second sampled signal;
   a pump injection current driver arranged to provide a control signal to the pump laser; and
   a servo control responsive to the first detected signal, the servo control being arranged to generate an error signal to cause the pump injection current driver to provide an injection current signal to the pump laser for varying the pump laser signal provided to the fiber assembly which causes the light source to cancel out intensity fluctuations of the light output at the second photodetector, in order to thereby suppress the relative intensity noise, wherein the tap coupler, the first photodetector, the pump injection current driver, the pump laser and the servo control comprise a feedback loop which utilizes negative feedback to control the intensity fluctuations, and wherein the servo control comprises a voltage amplifier comprising characteristics such that an open loop gain of the feedback loop is responsive to a gain provided by the erbium-doped broadband light source;
   wherein the servo control further comprises at least a second order feedback control logic.

7. The system according to claim 6, wherein the second order feedback control logic comprises a lead-lag circuit.

8. The system according to claim 7, wherein the lead-lag circuit comprises a resistor connected in parallel with a capacitor, and a load resistor connected to a negative terminal of an operational amplifier.

9. The system according to claim 7, wherein the lead-lag circuit has an output connected to an input of an adder and an input connected to an output of the voltage amplifier.

10. A system for suppression of relative intensity noise in a fiber optic gyroscope comprising:
    an erbium-doped broadband light source that generates a light output, the erbium-doped broadband light source configured to control the light fluctuations of the light output;
    a fiber tap coupler coupled to receive the light output and to sample a part of it to provide a sampled signal;
    a photodetector coupled to sense the sampled signal, detect its intensity fluctuations, and convert the sampled signal to a detected signal having a voltage proportional to an intensity of the sampled signal; and
    a servo control, responsive to the detected signal, the servo control being arranged to generate an error signal to cause the erbium-doped light source to vary an intensity of the light output so as to cancel out intensity fluctuations of the light output, the servo control being configured to have a maximum power gain at a frequency at or above a bias modulation frequency, wherein the tap coupler, the photodetector, the erbium-doped light source and the servo control comprise a negative feedback loop having an open loop gain responsive to a gain provided by the erbium-doped light source.

11. The system according to claim 10, wherein the photodetector comprises a photodiode and a trans-impedance amplifier.

12. The system according to claim 10, wherein the servo control logic has a bandwidth of at least 200 kHz.

13. The system according to claim 10, wherein the light source comprises a polarizer.

14. A system for suppression of relative intensity noise in a fiber optic gyroscope comprising:
    an erbium-doped broadband light source that generates a light output, the erbium-doped broadband light source configured to control the light fluctuations of the light output;
    a fiber tap coupler coupled to receive the light output and to sample a part of it to provide a sampled signal;
    a photodetector coupled to sense the sampled signal, detect its intensity fluctuations, and convert the sampled signal to a detected signal having a voltage proportional to an intensity of the sampled signal; and
    a servo control, responsive to the detected signal, the servo control being arranged to generate an error signal to cause the erbium-doped light source to vary an intensity of the light output so as to cancel out intensity fluctuations of the light output, wherein the tap coupler, the photodetector, the erbium-doped light source and the servo control comprise a negative feedback coo having an open loop gain responsive to a gain provided by the erbium-doped light source;
    wherein the servo control further comprises at least a second order feedback control logic.

15. The system according to claim 14, wherein the second order feedback control logic comprises a lead-lag circuit.

16. The system according to claim 15, wherein the lead-lag circuit has an output connected to an input of an adder and an input connected to an output of a voltage amplifier.

17. The system according to claim 15, wherein the lead-lag circuit comprises a parallel combination of a resistor and a capacitor coupled between an output and a negative input terminal of an operational amplifier, and wherein the lead-lag circuit further comprises a load resistor connected to the negative terminal of the operational amplifier.

18. A method for suppression of relative intensity noise in a fiber optic gyroscope comprising:
    sampling a light output from an erbium-doped light source so as to provide a sampled signal as an output;
    converting the sampled signal to a control signal representing an intensity of the light output; and
    amplifying the control signal so as to produce an error signal, wherein a servo control is configured to have a maximum power gain at a frequency at or above a bias modulation frequency, controlling a pump power signal provided to the erbium-doped light source in accordance with the error signal such that the intensity of light from the light source is modulated at each frequency with a modulation amplitude change responsive to gain provided by the erbium doped light source at each of the frequencies.

19. A method for suppression of relative intensity noise in a fiber optic gyroscope comprising:

sampling a light output from an erbium-doped light source so as to provide a sampled signal as an output;

converting the sampled signal to a control signal representing an intensity of the light output; and amplifying the control signal so as to produce an error signal; and controlling a pump power signal provided to the erbium-doped light source in accordance with the error signal such that the intensity of light from the light source is modulated at each frequency with a modulation amplitude change responsive to gain provided by the erbium doped light source at each of the frequencies;

wherein the amplifying of the control signal comprises amplifying the control signal in a second-order negative feedback loop.

20. The method according to claim 19, wherein the second-order negative feedback loop comprises a lead-log circuit.

21. A fiber optic gyroscope system comprising:

a rare earth element doped broadband light source that provides a light output, wherein the light source has a source gain;

an optical coupler having first, second, third, and fourth coupler ports, wherein the first coupler port is coupled to the light source, wherein the coupler is arranged to couple light from the first coupler port to the third and fourth coupler ports but not to the second coupler port, and to couple light from the third coupler port to the first and second coupler ports but not to the fourth coupler port;

a splitter having a first splitter port coupled to the third coupler port, a second splitter port coupled to one end of a fiber coil, and a third splitter port coupled to another end of the fiber coil;

a first detector coupled to the fourth coupler port, wherein the first detector has a detector gain; and a second detector coupled to the second coupler port;

a feedback controller coupled between the first detector and the light source and arranged to suppress intensity fluctuations in the light output, wherein the feedback controller has a feedback gain that is at a maximum at a frequency at or above a bias modulation frequency, and wherein the source gain plus the detector gain plus the feedback gain is positive over at least an 80 kHz bandwidth.

22. The fiber optic gyroscope system of claim 21, wherein the source gain plus the detector gain plus the feedback gain is positive over a frequency range of 20 kHz to 200 kHz.

23. The fiber optic gyroscope system of claim 21, wherein the feedback controller comprises a high pass amplifier.

24. The fiber optic gyroscope system of claim 23, wherein the feedback controller comprises an adder coupled to the high pass amplifier and to a reference, and to a light source driver, wherein the light source driver is coupled to the light source, and wherein the high pass amplifier is coupled to the first detector.

25. A fiber optic gyroscope system comprising:

a rare earth element doped broadband light source that provides a light output, wherein the light source has a source gain;

an optical coupler having first, second, third, and fourth coupler ports, wherein the first coupler port is coupled to the light source, wherein the coupler is arranged to couple light from the first coupler port to the third and fourth coupler ports but not to the second coupler port, and to couple light from the third coupler port to the first and second coupler ports but not to the fourth coupler port;

a splitter having a first splitter port coupled to the third coupler port, a second splitter port coupled to one end of a fiber coil, and a third splitter port coupled to another end of the fiber coil;

a first detector coupled to the fourth coupler port, wherein the first detector has a detector gain; and a second detector coupled to the second coupler port;

a feedback controller coupled between the first detector and the light source and arranged to suppress intensity fluctuations in the light output, wherein the feedback controller has a feedback gain, and wherein the source gain plus the detector gain plus the feedback gain is positive over at least an 80 kHz bandwidth;

wherein:

the feedback controller comprises a high pass amplifier and an adder coupled to the high pass amplifier and to a reference, and to a light source driver, wherein the light source driver is coupled to the light source, and wherein the high pass amplifier is coupled to the first detector; and wherein the feedback controller further comprises a lead-lag amplifier coupled between the high pass amplifier and the adder.

26. A fiber optic gyroscope system comprising:

a rare earth element doped broadband light source that provides a light output, wherein the light source has a source gain;

an optical coupler having first, second, third, and fourth coupler ports, wherein the first coupler port is coupled to the light source, wherein the coupler is arranged to couple light from the first coupler port to the third and fourth coupler ports but not to the second coupler port, and to couple light from the third coupler port to the first and second coupler ports but not to the fourth coupler port;

a splitter having a first splitter port coupled to the third coupler port, a second splitter port coupled to one end of a fiber coil, and a third splitter port coupled to another end of the fiber coil;

a first detector coupled to the fourth coupler port, wherein the first detector has a detector gain; and a second detector coupled to the second coupler port;

a feedback controller coupled between the first detector and the light source and arranged to suppress intensity fluctuations in the light output, wherein the feedback controller has a feedback gain, and wherein the source gain plus the detector gain plus the feedback gain is positive over at least an 80 kHz bandwidth;

wherein the feedback controller comprises a high pass amplifier; and wherein the feedback controller further comprises a lead-lag amplifier.

* * * * *

UNITED STATES PATENT AND TRADEMARK OFFICE
CERTIFICATE OF CORRECTION

PATENT NO. : 6,765,678 B2
DATED : July 20, 2004
INVENTOR(S) : Lee K. Strandjord et al.

It is certified that error appears in the above-identified patent and that said Letters Patent is hereby corrected as shown below:

Column 18,
Line 42, change "coo" to -- loop --.

Signed and Sealed this

Sixteenth Day of August, 2005

JON W. DUDAS
*Director of the United States Patent and Trademark Office*